(12) United States Patent
Ofer et al.

(10) Patent No.: US 6,209,059 B1
(45) Date of Patent: Mar. 27, 2001

(54) METHOD AND APPARATUS FOR THE ON-LINE RECONFIGURATION OF THE LOGICAL VOLUMES OF A DATA STORAGE SYSTEM

(75) Inventors: Erez Ofer, Brookline; John Fitzgerald, Mansfield; Kenneth Halligan, Leominster, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/937,467

(22) Filed: Sep. 25, 1997

(51) Int. Cl.[7] .................................................... G06F 12/00
(52) U.S. Cl. ........................ 711/114; 711/170; 711/173; 714/7
(58) Field of Search ....................... 395/182.05; 711/114, 711/170, 173; 714/7

(56) References Cited

U.S. PATENT DOCUMENTS

| | | | |
|---|---|---|---|
| 5,297,258 | * | 3/1994 | Hale et al. ............................ 711/114 |
| 5,418,925 | * | 5/1995 | DeMoss et al. ...................... 711/114 |
| 5,440,716 | * | 8/1995 | Schultz et al. ....................... 711/114 |
| 5,515,499 | * | 5/1996 | Allen et al. .............................. 714/5 |
| 5,574,851 | * | 11/1996 | Rathunde ........................ 395/182.05 |
| 5,893,160 | * | 4/1999 | Loewenstein et al. ............... 711/152 |
| 6,032,217 | * | 2/2000 | Arnott ................................. 710/200 |

* cited by examiner

*Primary Examiner*—Do Hyun Yoo
*Assistant Examiner*—Nasser Moazzami
(74) *Attorney, Agent, or Firm*—John M. Gunther; Leanne J. Fitzgerald

(57) ABSTRACT

A method of dynamically reconfiguring the logical devices in a storage system is provided. The method allows a logical devices to be added, removed, or repositioned without requiring the storage system to be taken off-line. The method includes manipulating the request queues associated with host controllers within the storage system. The request queues associated with each logical device may be repositioned in the request queue memory in order to make room for new logical devices or to take advantage of free space associated with a removed logical device. The storage system communicates with the host computer in order to manage the reconfiguration of the request queues while still providing storage services to the host computer.

1 Claim, 3 Drawing Sheets

METHOD AND APPARATUS FOR THE ON-LINE RECONFIGURATION OF THE LOGICAL VOLUMES OF A DATA STORAGE SYSTEM

BACKGROUND OF THE INVENTION

This invention relates generally to storage systems associated with computer systems and more particularly to providing a method and apparatus for dynamically reconfiguring the logical volumes of a data storage system. That is, the invention provides a storage system which allows for re-partitioning of the addressable blocks of main storage space, while a storage system is on-line, with no downtime.

Computer systems generally include a central processing unit, a memory system, and a data storage system. Some modem computer systems which include both mainframe and open system platforms, may use a sophisticated storage system to simultaneously provide storage for different data formats (e.g. CKD and FBA). An enterprise data storage system (EDSS), such as the Symmetrix ESP by EMC Corp., may be used to provide such storage needs. An EDSS is a versatile data storage system having the connectivity and functionality to simultaneously provide storage services to types of host computers (e.g. mainframes and open system hosts). A large number of main, physical storage devices (e.g. an array of disk devices) may be used by an EDSS to provide data storage for several hosts. The EDSS storage system is typically connected to the associated host computers via dedicated cabling or a network. Such a model allows for the sharing of centralized data among many users and also allows a single point of maintenance for the storage functions associated with the many computer systems.

Today's physical storage devices may include disk drives, tape drives, and optical drives. A physical storage device generally corresponds to a physical volume. The physical volumes are generally associated with logical volumes so that the storage devices can be accessed in a convenient manner by the attached host computers. A storage system's logical to physical relationship may be established by mapping the physical volumes to logical devices which accommodate storage needs of the applications or operating systems associated with the host computers attached to the storage system. The logical device sizes and configurations are limited by a storage system physical constraints as well as the attached host types (e.g. mainframe and open system type computers). Once logical volumes are established, the attached host computers can access the storage space using logical addresses and control signals. The logical volumes, therefore, and not the physical volumes, are seen as storage space by the attached hosts.

In order to configure logical volumes, present prior art storage systems require a system administrator, using a Logical Volume Manager software package, to configures the logical volumes while the storage system is off-line. Once the logical volumes are configured, an attached host may then begin communications with the new logical volumes However, in order to recognize the new logical volume configuration, a host and the associated storage system may need to be re-initialized or rebooted. After the host completes the boot procedure, the host can then scan the associated buses (of the storage system) and determine the logical volumes that are dedicated to its storage needs.

During the life of a storage system, it often becomes necessary to increase the physical storage space or reassign certain storage resources to different hosts. This modification may be done to accommodate more hosts, add user accounts, add or reallocate volumes, modify assignments of hosts to storage resource, or change emulation modes. Also, the storage resources may simply be reallocated among the active hosts in order to provide a different configuration with to achieve different security features, greater performance, or increased reliability. These modifications require a reconfiguration of the logical volumes so that the new or altered physical volumes can be mapped to logical volumes and used by the attached hosts. Prior art storage systems must be off-line for logical volume reconfigurations. That is, all storage devices within the storage system being reconfigured are not accessible by any host during the logical volume reconfiguration. Shutting down a storage system, especially an EDSS, for a logical volume reconfiguration is usually complex, cumbersome, and inefficient. It may even be economically impossible since many business environments require that the disk devices of a storage system be available twenty-four hours a day, seven days a week. It would be advantageous therefore to provide a dependable procedure for reconfiguring the logical volumes of a storage system, while simultaneously allowing the hosts to actively access the logical volumes of the original configuration so as not to disturb any active applications.

SUMMARY OF THE INVENTION

In accordance with one aspect of the present invention, a method is provided which achieves dynamic on-line storage system reconfiguration. The invention is particularly useful in storage systems which include a request queue for managing the data storage requests received from a host computer and where the request queue includes a plurality of device queues, one for each storage device of the storage system. The method includes receiving a reconfiguration command at the storage system. In response to receipt of the reconfiguration command, the storage system saves the current configuration. A configuration is generally defined as the total number of storage devices in the storage system and an arrangement of device queues in the request queue used to manage requests to those devices. The storage systems continues to operate according to the current configuration. While operating according to the current configuration, a new configuration is defined. This is accomplished by rearranging the request queue and redefining said device queues within request queue to accommodate new devices or to recapture queue storage associated with deleted devices. Once the new configuration is defined, the storage system is operated in accordance therewith. With such a method, a storage system may be reconfigured in whole or part to include more storage devices, eliminate storage devices, or rearrange the placement of storage devices. All of the reconfiguration occurs with minimal interruption to the host computers attached to the storage system. That is, since the storage system remains on-line, other host systems not associated with the new or changed devices incur no penalty. The hosts associated with the reconfiguration may incur a momentary stall while the queues are compressed and reconfigured. In any event, the lengthy procedure of rebooting a storage system is avoided.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
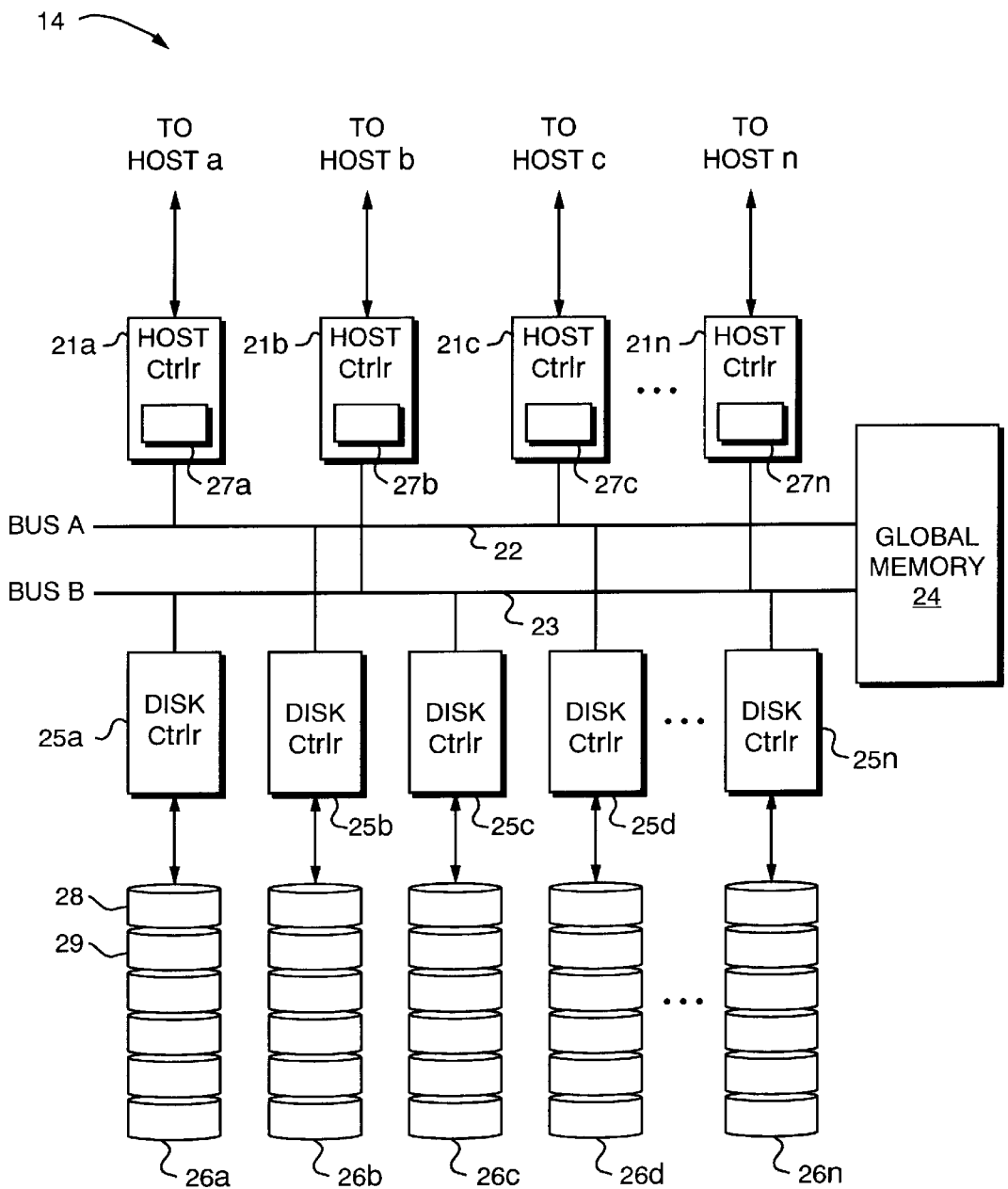
FIG. 1 is a diagrammatic representation of a data storage system of incorporating the present invention.

Referring first to FIG. 1 storage system 14 is shown to include a plurality of host controllers 21a–21n which are, according to a preferred embodiment of the present invention, coupled alternately to buses 22 and 23. Each host controller 21a–21n is responsible for managing the communication between its associated attached host computers and storage system 14. The host controllers of the preferred embodiment may include on or more central processing units (CPUs). The controller CPUs operate under program control to manage the flow of data between an associated host computer and the storage system 14. In addition, each host controller 21a–21n may also include internal queues 27a–27n respectively. As will be described in more detail below, the internal queues are used to store incoming requests from an attached host computer until the request can be serviced by the storage system.

Also coupled alternately to buses 22 and 23 are a plurality of disk controllers 25a–25n. Controllers 25a–25n are here similar in construction to controllers 21a–21n. That is, each includes at least one CPU configured to operate under control of a program loaded into an associate CPU program memory. Coupled to each disk controller is an array of storage devices which as shown here may be magnetic disk devices. Like the host controllers described above, each disk controller is responsible for managing the communications between its associated array of disk drives and the host controllers or memory 24 of storage system 14.

Generally, the storage devices of arrays 26a–26n are configured as so called logical devices. According to a preferred embodiment of the present invention, a logical device is virtual device which includes a range of storage area corresponding to a partial or entire physical device. That is for example, a first logical device of storage system 14 may include one third the storage area of storage device 28 while a second logical device includes the remaining two thirds of storage area of that same drive. A third logical device of storage system 14 may include the entire storage device 29. Logical device addressing provides a convenient addressing scheme to the host computers attached to storage system 14.

Still referring to FIG. 1, each of the host controllers 21a through 21n include a request queue 27a through 27n respectively. As will be discussed in more detail below, each of the request queues 27a through 27n actually includes a queue for each logical device that is accessible by the respective host controller. Request queues 27a through 27n are used to store incoming requests from the host computer attached to the respective host controller until the requests can be transferred and/or satisfied by the disk controller controlling logical device which is the target of the host request. Generally and as will be described in more detail below, the number of requests that can be stored in any request queue associated with a particular logical device is governed by the total number of logical devices which are accessible by a particular host controller.

Figure 2:
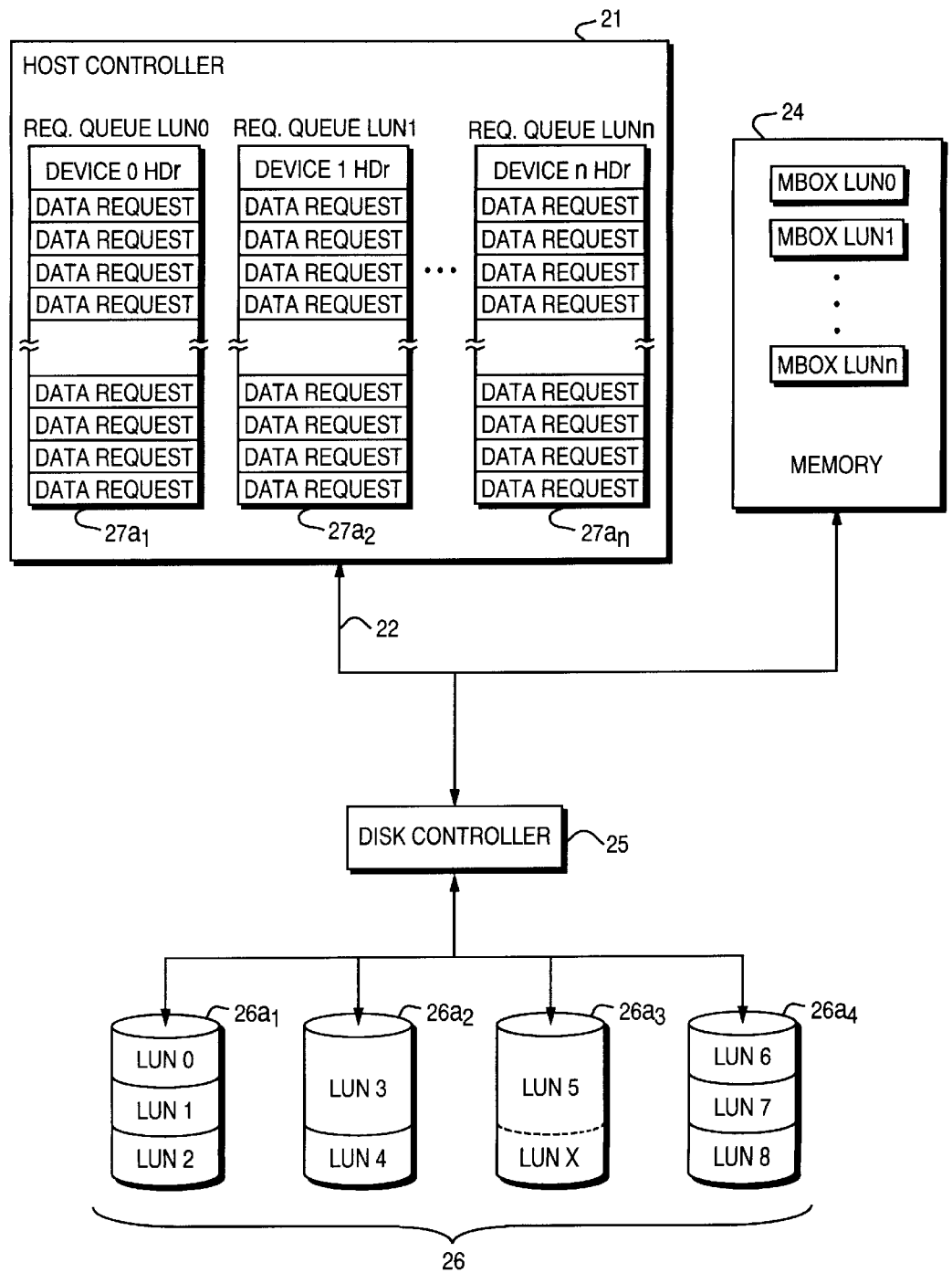
FIG. 2 is a diagram of exemplary ones of a host controller, disk controller and storage devices of the storage system of FIG. 1.

As shown in FIG. 2, host controller 21 includes a plurality of request queues $27a_1$ through $27a_n$. The actual number of request queues corresponds to the number of logical devices which may be accessed by host controller 21. Each request queue is used to store the data request received from the host computer which are directed to a particular logical device. When host controller 21 receives a data request from the host computer it identifies which logical device is the target of the data request and places the request in the appropriate request queue. For example, a data request to logical device zero would be stored in queue $27a_1$.

Referring now to FIG. 2, an exemplary one of host controllers 21 and an exemplary one of disk controllers 25 are shown to be coupled to each other and further to memory 24. Since each of the controllers is representative of all respective controllers in the system they will be referred to by their generalized reference numeral taken from FIG. 1. As shown, host controller 21 includes a plurality of request queues $27a_1$ through $27a_n$ which are used to store incoming data requests from an associated attached host computer. Disk controller 25 is shown to have attached thereto a disk array 26 which further includes four disk devices $26a_1$ through $26a_4$. As can be seen, each of the individual disks of array 26 is further configured to provide one or more logical devices. That is, for example, disk device $26a_1$ is configured to provide logical devices (also known as logical units or LUNs) zero, one and two. Similarly, disk $26a_2$ is configured to provide logical unit three and logical unit four. Disk $26a_3$ is configured to provide a single logical unit labeled logical unit 5. Disk $26a_3$ is also shown to include a logical unit X. This represents the state of array 26 after a reconfiguration of the logical devices associated with host controller 21 has been performed. Thus at a first point in time t, disk $26a_3$ is configured to provide only the single logical unit 5. As will be described in detail below, when the reconfiguration is complete disk $26a_3$ will be configured to provide two logical units, namely logical unit 5 and logical unit X.

Memory 24 is here used as a communications path between host controller 21 and disk controller 25. As shown, memory 24 includes a plurality of mailboxes 40a through 40n, where each mailbox is associated with a particular logical device. Thus the total number of mailboxes in memory 24 corresponds to the total number of logical devices in storage system 14. Each request for read or write of data to a particular logical device requires that the request be placed in the appropriate mailbox corresponding to that logical device.

Figure 3A:
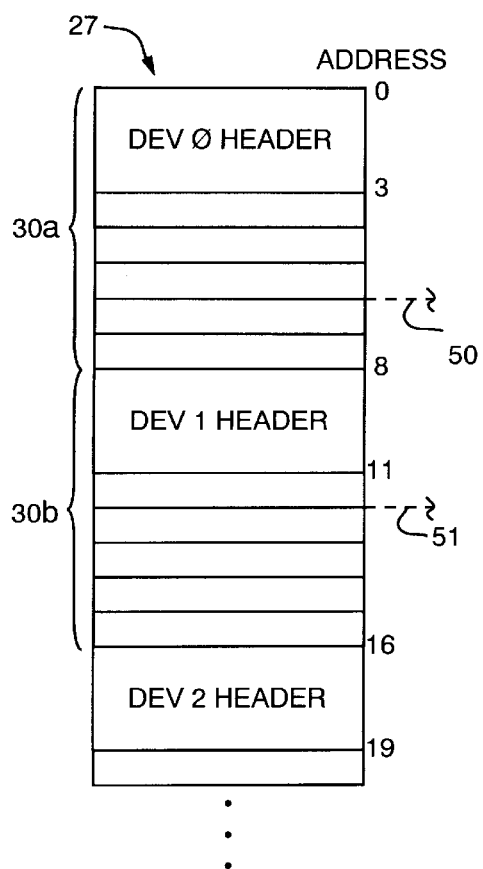
FIG. 3A illustrates a configuration of a request queue of a host controller of FIG. 2 before reconfiguration of the storage system of FIG. 1.
Figure 3B:
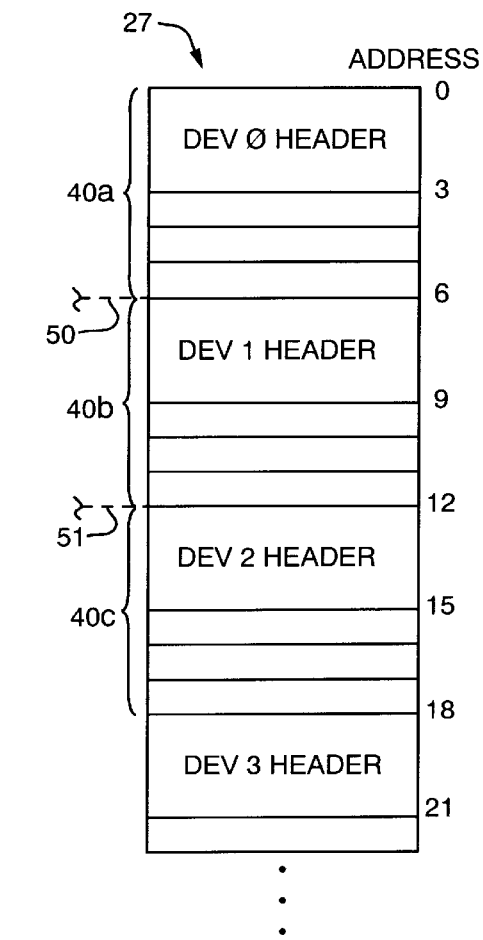
FIG. 3B illustrates a configuration of the request queue of FIG. 3B after reconfiguration of the storage system of FIG. 1.

The process for reconfiguring the logical devices of array 26 of storage system 14 will now be discussed while referring to FIGS. 3A and 3B. FIG. 3A represents the configuration of a request queue 27 of, for example, controller 21 prior to reconfiguration while FIG. 3B represents the arrangement of the same request queue after the logical devices the storage system have been reconfigured. Referring first to FIG. 3A, request queue 27 is shown to include storage for addresses 0 through i for a plurality of individual device queues 30a through 30n. As shown, each individual device queue, for example device queue 30a, includes a device header which provides definition and translation information for the associated logical device. Thus, for example, individual device queue 30a may be associated with logical unit zero of disk device $26a_1$ (FIG. 2). Also as shown, each device header includes three address locations dedicated to header information. The remaining entries for individual device header 30a are the individual data requests as received from the host computer. Similarly, individual request queue 30b includes header information and address locations 8 through 11, and has data request entries in addresses 11 through 16. Individual device queue 30*b* might correspond, for example, to logical unit one of disk device 26A1 (FIG. 2). The number of individual device queues in request queue 27 would be represented by a number n where 30*n* would be the last individual device queue in queue 27. The number of entries that are available for each of the individual device queues is a function of the total memory available for queue 27 and the number of logical devices which are accessible by the host controller associated with request queue 27. It should be understood, that the addresses used to describe queue 27 are for illustration purposes only. The preferred embodiment of storage system 14 actually reserves 400 bytes of information for the header portion of each device queue and 100 bytes for each request entry.

During the lifetime of storage system 14, it may become necessary to reconfigure the logical volumes associated with one or more hosts attached to the storage system. This is traditionally accomplished by adding or removing physical storage devices and increasing or decreasing the number of logical devices available in the storage system. In order for host controller, such as host controller 21, to be able to direct data requests from the host computer to the new logical devices in a correct fashion, the request queue (e.g. queue 27) associated with host controller 21 needs to be reconfigured to include an individual device queue for every device accessible by host controller 21.

According to the present invention, the process of reconfiguring logical volumes (i.e., reconfiguring the request queue of host controller 21) is performed without requiring that storage system 14 be taken off-line. The method of the present invention generally includes six steps which occur in order. Depending on the new configuration, some steps may be skipped depending on whether logical devices are being added or deleted. The six steps generally include: saving the current configuration of the host controller request queue, compressing the records of the request queue, removing a device queue if appropriate, adding a device queue if appropriate, sorting the new record structure, and expanding each device record if devices are being removed.

The first step of saving the internal configuration of request queue 27 generally involves storing information regarding the number of current logical devices represented in queue 27 along with the total amount of storage associated with queue 27 to a temporary scratch area located either within controller 21 or alternately in memory 24. The compression of the request queue or the records associated therewith include several steps beginning with a recalculation of the number of data requests that will be associated with each individual device queue of a request queue 27. That is, for example, if five logical devices were being added and it is known that each device header requires a fixed amount of storage, then the number of available request entry records for each individual device queue may be calculated by taking the total address space (for example i) subtracting the amount of storage required for all of the device headers, then taking the remaining storage space and dividing it equally among the number of logical devices which will be accessible by host controller 21.

Once the new space for storage requirements for request queue 27 are determined, the current individual request queues need to be compressed in order to provide the address space required for the addition of the new devices. In order to compress the entire request queue 27, first each individual device queue (for example 30*a*) needs to be compressed to the number of entries it will support for the particular device once reconfiguration is complete. The reason this is necessary is illustrated by the dashed lines 50 and 51 between the request queues of FIGS. 3A and 3B. That is, after the new devices are added with a fewer number of entries per device, the device one record 40*b* of FIG. 3B will now map to address locations which include address locations which were previously allocated to the device zero request queue 30*a*.

It is required that the entries in device queue 30*a* which have not been serviced, remain in tact. Thus according to the present invention, in order to shrink the queue entries for each individual device queue, host controller 21 associated with request queue 27 would continue to process those requests, in for example individual request queue 30*a*, while at the same time disallowing the entry of any new requests to be placed in request queue 30*a* by the associated host computer. This may be accomplished by asserting a signal line in controller 21 or by returning a queue_full status to the host computer when it attempts to generate a new request to host controller 21. The same procedure is followed for each individual request queue 30*b* through 30*n*. When each of the individual request queues has only that number of entries which will be associated with the new size of the individual request queue after reconfiguration, the entire request queue 27 is compressed.

Compression may be performed in any number of ways. In the preferred embodiment of the present invention, the information associated with individual device queue 30*b* would merely be shifted into those address locations previously occupied by entries of device queue 30*a* with the result being that as shown in FIG. 3B. A similar shuffling is done for each of the individual request queues 30*c* through 30*n*.

Once all the request queues 30*b* through 30*n* have been shifted into the new address locations and thus becoming new device queues 40*b* through 40*m*, individual device queue entries will be available at the end of request queue 27 of FIG. 3B for addition of new logical devices (for example LUNx as shown in FIG. 2). That is, although space has been allocated properly for an individual device queue, individual request queues 40*m* will not contain any data or requests. At this point in time, information identifying the new device would be written into the header portion of individual device queue 40*m*.

One requirement of the preferred embodiment storage system is that the device queues of the request queue 27 reside in the request queue in a logical, for example, ascending order. Thus if the new device (e.g. LUNx) which has been added to entry 40*n* is not logically numbered higher than all previous request queues, then the entire request queue 27 will need to be reordered such that the new device queues are in correct logical order. That is, referring back to FIG. 2, the device queue information at location 40*m* which corresponds to LUNx will need to be repositioned such that it follows the device queue for LUN5 and precedes the device queue for LUN6. Sorting of the device queues may be done using any number of sorting schemes known to those of skill in the art. Once the entire request queue 27 has been sorted, the request queue is then available for controller 21 to service requests from its attached host computer.

If the process above had included only removing devices, a last and final step in the reconfiguring of request queue 27 would have included expanding the individual device queues to fill the space left available by the removal of a single device.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method of dynamic on-line storage system reconfiguration wherein said storage system includes a request queue and wherein said request queue includes a plurality of device queues, one for each storage device, each of the device queues having entries corresponding to each storage device, said method comprising the steps of:

receiving a reconfiguration command;

saving a current configuration of said storage system, said current configuration including a number of storage devices in said storage system and an arrangement of device queues in said request queue;

continuing to operate said storage system according to said current configuration;

reconfiguring the request queue to accommodate a new configuration of said storage system by compressing each device queue to support the number of entries needed for the storage device;

updating said request queue to the new configuration;

operating said storage system in accordance with said new configuration;

based on new configuration parameters, calculating a new device queue size associated with each storage device of said new configuration;

preventing new entries to be placed in the request queue; and during said preventing step, servicing requests in said request queue until the number of outstanding requests for each of said device queues is less than or equal to a capacity of said new device queue size.

* * * * *